United States Patent
Jones et al.

(10) Patent No.: US 7,644,733 B2
(45) Date of Patent: Jan. 12, 2010

(54) DUCT WITH SPIRAL GROOVE

(75) Inventors: Trevor Frank Jones, Derby (GB); Jeyakumar Ganeshalingham, London (GB); Benjamin Raylor, East Yorkshire (GB)

(73) Assignee: The University of Nottingham, Nottingham (GB)

( * ) Notice: Subject to any disclaimer, the term of this patent is extended or adjusted under 35 U.S.C. 154(b) by 808 days.

(21) Appl. No.: 10/512,286

(22) PCT Filed: Apr. 25, 2003

(86) PCT No.: PCT/GB03/01792

§ 371 (c)(1),
(2), (4) Date: Sep. 12, 2005

(87) PCT Pub. No.: WO03/091578

PCT Pub. Date: Nov. 6, 2003

(65) Prior Publication Data

US 2006/0048831 A1 Mar. 9, 2006

(30) Foreign Application Priority Data

Apr. 25, 2002 (GB) ................................. 0209454.8

(51) Int. Cl.
F15D 1/04 (2006.01)
(52) U.S. Cl. ............................. 138/37; 138/39; 138/177
(58) Field of Classification Search .................. 138/39, 138/37; 366/338, 339; 137/177
See application file for complete search history.

(56) References Cited

U.S. PATENT DOCUMENTS 2,537,940 A * 1/1951 Peake ......................... 223/107
3,313,577 A    4/1967 Wolfe
3,647,187 A * 3/1972 Dannewitz et al. .......... 366/339
3,719,207 A * 3/1973 Takeda ..................... 366/181.5
4,111,402 A * 9/1978 Barbini ....................... 366/338
4,621,953 A * 11/1986 McGuth ...................... 406/193
4,747,697 A * 5/1988 Kojima ........................ 366/339
5,605,400 A * 2/1997 Kojima ........................ 366/339
6,116,284 A * 9/2000 Murray et al. ................ 138/39
6,997,214 B2 * 2/2006 Kuo ............................ 138/39
7,114,524 B2 * 10/2006 Houston et al. .............. 138/37

(Continued)

FOREIGN PATENT DOCUMENTS

DE    4128202    3/1993

(Continued)

OTHER PUBLICATIONS

Schriek, W. et al., "The Properties of Helically Ribbed Pipes for Solids Transport," CIM Bulletin, Oct. 1974, pp. 84-91.

*Primary Examiner*—Patrick F Brinson
(74) *Attorney, Agent, or Firm*—Baker Botts LLP

(57) ABSTRACT

A duct (10) for transporting a two phase mixture has a length portion of circular cross-section (12) leading, via a transition zone (14) in which the duct cross-section changes from circular to lobed, to a zone in which its cross-section exhibits at least one lobe (16) extending helically around and along the duct. The duct has a cross-sectional area which is substantially constant, or which progressively increases, over the transition zone. The transition from circular to lobed cross-section is alternatively smooth and continuous, and the transition zone occupies a duct length in which the or each lobe becomes relocated by at least one position.

52 Claims, 8 Drawing Sheets

U.S. PATENT DOCUMENTS

2005/0241605 A1 * 11/2005 Bedwell et al. ........ 123/184.21

FOREIGN PATENT DOCUMENTS

| EP | 0922812 A2 | 9/1989 |
| EP | 1127557 | 8/2001 |
| FR | 1002454 | 3/1952 |
| JP | 2048335 | 2/1990 |
| WO | WO 0038591 | 6/2000 |
| WO | 0038591 | 7/2000 |

* cited by examiner

DUCT WITH SPIRAL GROOVE

This invention relates to a duct. More particularly but not exclusively it relates to a duct for the conveyance of a two-phase mixture.

The transportation of two phase mixtures is of significance in a wide range of industries where the transport of particulates in a fluid is required, for example slurries. The mining and mineral industries are heavily involved in transporting aqueous slurries as are the water authorities and the nuclear industry. Oil and gas industries also have requirements for dealing with solids in their fluids. In addition to their needs for transportation of fluids, all these industries also have processing plants in which particle-laden fluids must be passed from machine to machine by pipe. In many processing plants—for food processing for example—particle-laden fluids must be processed.

FIG. 1 is a graph of head loss (pressure drop) against velocity in a duct conveying a two-phase liquid/particulate mixture, and it illustrates three flow regimes associated with such a mixture, for example a slurry. Firstly, there is a settling, sedimentation, regime where the slurry is not moving with sufficient mean velocity to prevent the settling of a more dense particulate phase from the slurry onto horizontal surfaces of a duct. This occurs when the mean velocity of the slurry falls below a critical velocity, $v_c$, and it leads to a progressive build-up of solids and eventual blocking of the duct. The critical velocity is a velocity close to, but not necessarily coincident with, the velocity at the minimum on the pressure/velocity curve (FIG. 1). Above the critical velocity there is an asymmetric flow regime, where the denser phase is asymmetrically distributed within the liquid in that it preferentially resides in the lower part of the duct but still flows along the duct, some of the particles being entrained within the liquid phase of the slurry in the upper part of the duct. At still higher velocities, there is a symmetric flow regime where the particulate phase of the slurry is substantially homogeneously distributed and entrained in the liquid phase of the slurry.

In industrial plants it is usual to operate in the asymmetric flow regime as there is a trade off between the desire for homogenous distribution of the two phases, the power required to achieve symmetric flow, and wear of the duct. This is because the pumping power that must be input into a system in order to achieve a specified mean flow velocity varies approximately as $v^3$ and therefore operating at the high mean flow velocities necessary for symmetric flow is energy intensive and therefore costly.

Furthermore, the wear rate experienced by the internal surfaces of a duct varies approximately as $v^{3.5}$. Thus, not only is maintaining high flow velocities expensive in terms of power consumption, but it also reduces the working life of a plant or contributes to high maintenance costs. It is accordingly desirable to reduce the flow velocity in order to increase the lifetime of the duct. This is particularly true of a curved section in a duct where there is preferential wear on an outer wall of the curved section of the duct due to the denser phase striking the wall head on. This leads to increased wear on the outer wall resulting in scarring, or pitting, of the wall. In addition, the concave curvature of the bend may focus rebounding particles onto a point on the intrados of the bend. This also has the potential to create scar damage. Any scarring will promote turbulence in the slurry which accelerates the rate of wear of the surface even further, eventually leading to failure of the duct at the site of the scarring.

A number of arrangements have been suggested to reduce these problems including introducing intrusive curved vanes into the centre of the flow-path in order to introduce a component of velocity into the mixture which is tangential to the duct wall. A problem associated with this arrangement is that the vanes themselves are particularly subject to erosion and they may become detached from a wall of the duct and can then be carried downstream and cause damage to process equipment and pumps.

The introduction of a helical rib attached to the wall of a straight flow-path has also been suggested, see Wolfe's U.S. Pat. No. 3,313,577 as a way of introducing a tangential component to the velocity of a mixture flowing along a duct. Systems incorporating such a helical rib have the problem that the mixture is subjected to an abrupt change in its flow characteristics upon encountering the rib. This can lead to turbulence and consequent energy losses requiring an increase in the power that needs to be supplied to run the system. Also, any such rib may be subjected to strong erosion forces.

It is an object of at least one embodiment of the present invention, to at least partially, mitigate at least one of the above mentioned problems and/or disadvantages.

According to a first aspect of the present invention there is provided a duct having at least one length portion of circular cross-section, characterised in that the duct further includes a zone in which its cross-section exhibits at least one lobe, the or each said lobe extending helically around and along the duct, and the duct having a substantially constant cross-sectional area over a transition zone in which the duct cross-section changes from circular to lobed.

This arrangement allows control over particulate distribution within a carrier fluid flowing in a downstream direction through such a transition zone towards a lobed region of the duct to a greater extent than prior art arrangements and thus allows particle suspension, for example in an asymmetric flow regime, to be achieved at a lower velocity than would otherwise be the case. Power losses due to changes in duct cross-sectional area are substantially avoided. The pumping power required to achieve particle suspension is less than would be the case if the particles were in a bed at the bottom the pipe, because relatively high axial velocities would not be required to achieve this state of suspension. The axial velocity could approach that required to merely transport the particulate slurry. In some embodiments of the invention, the helix goes clockwise in the downstream fluid flow direction, and in other embodiments of the invention, the helix goes anticlockwise.

Preferably the transition from circular to lobed cross-section is smooth and continuous and takes place over a said transition zone occupying a duct length in which the or each lobe becomes relocated by at least one position.

Thus, if normal cross-sections are taken at upstream and downstream locations at or towards each end of the transition zone duct length and notionally superposed one on the other (without any relative rotation), the least amount by which the position of any given lobe will have been rotated to satisfy this condition in going from the upstream to the downstream cross-section is that which gives a (first) non-overlapping relationship between the two positions of such lobe. For example, considering the case where there are provided three contiguous lobes whose cross-sections are formed as three semi-circles meeting at cusps at the apices of a notional equilateral triangle, the minimum angle through which a given lobe must have been relocated will be 120°. In that case, at the downstream cross-section, each lobe will overlap with the position which a neighbouring lobe occupied at the upstream cross-section. In general, for n contiguous lobes, the minimum angle will be 360°/n. In the case of non-contiguous lobes, the minimum relocation angle is suitably 90°.

This feature is of considerable practical importance, and it offers advantages even when there is a non-negligible variation in the cross-sectional area of the duct in the transition zone.

According to a second aspect of the present invention there is provided a duct having at least one length portion of circular cross-section, characterised in that said duct further includes a zone in which its cross-section exhibits at least one lobe, the or each said lobe extending helically around and along the duct, and wherein the transition from circular to lobed cross-section is smooth and continuous and takes place over a transition zone occupying a duct length in which the or each lobe becomes relocated by at least one position.

This arrangement allows the control over the distribution of particulates within a mixture without significantly increasing turbulence in a system, and it promotes a low cost in terms of pressure drop at the transition zone.

In the most preferred embodiments of either aspect of the invention, when the helix is regular said transition zone occupies a duct length which is at least 5D/n and preferably 6.8D/n where D is again the diameter of the immediately preceding circular duct length portion, and n is the number of lobes.

We have found that such a transition zone is inefficient in generating swirl in the mixture being conveyed, and that it is usually unnecessary for said transition zone to occupy a duct length which gives more than one complete revolution of the helical lobe in order to avoid any significant increase in turbulence within the mixture being conveyed along the duct: thus the adoption of this feature is accordingly preferred.

In some preferred embodiments of the invention, the cross-sectional area of the duct in the zone of transition from circular to lobed increases progressively. This is of especial value in the control of pressure gradients which may occur in the conveyed fluid mixture, particularly if the pitch of the helix in the transition zones decreases in the downstream direction.

In other preferred embodiments, the duct has a substantially constant cross-sectional area over a said transition zone in which the duct cross-section changes from circular to lobed. This generally affords the advantages associated with the first aspect of the invention.

In some preferred embodiments such a lobed zone has a substantially constant cross-sectional area. And that is sometimes substantially equal to the cross-section of the preceding circular duct length portion when the transition zone itself is of substantially constant cross-sectional area.

In some embodiments the duct includes a bend in a helically lobed zone thereof. The duct may include a plurality of bends each of which is located in a helically lobed zone thereof.

The present invention is particularly advantageous in the presence of a bend in that there is a reduction in localised wear at an outer wall of the bend due to a more even distribution of particles within the mixture. This can lead to a more even distribution of wear in the regions adjacent the bend and may even result in an overall reduction in the amount of wear of the duct.

Preferably the or at least one helically lobed zone of the duct which is located spaced from the end thereof is followed by a second transition zone in which the lobed cross-section reverts to a circular cross-section. More preferably the cross-sectional area of the duct remains substantially constant over said second transition zone. In some embodiments said second transition zone occupies a duct length which is from 5/n to 11/n, for example from 6.8/n to 8.5/n times the duct diameter, where n is the number of lobes. The avoidance of abrupt changes in cross-sectional area and of abrupt changes of cross-sectional shape promotes low power consumption.

In some preferred embodiments of the invention, the pitch of the helical lobes in the first transition zone decreases towards the lobed portion.

In some preferred embodiment the pitch of the helical lobes in the lobed zone remains substantially constant. The pitch of the helical lobes in the second transition zone may also remain substantially constant. Preferably such constant helical pitch is between 5 and 11 times the diameter of the circular duct section. More preferably such constant helical pitch is between 6.8 and 8.5 times the diameter of the circular duct section. The use of a constant helical pitch of lobe avoids energy losses associated with such a change of pitch and this promotes low power consumption.

The optimal pitch-to-diameter ratio for the helix may, in fact, be subject to some variation in value for a helix of constant pitch. For example for 50 mm 3-lobe pipe, the optimum P/D is close to 6:1. However for 150 mm pipe, the optimum appears to be around 8:1. For 4-lobed pipe in a 50 mm main the optimum P/D value was again 8:1.

The use of two (disjunct) lobes gives excellent advantages in imparting swirl to the contents of the duct, but it also leads to a rather narrow, compressed flow path which can lead to blockage. Advantageously, therefore, there are at least three lobes at any given lobed zone.

There may be up to seven lobes at any given lobed zone. More advantageously there are four lobes at the or at least one lobed zone. Even more advantageously there are four lobes at the, or each lobed zone. The lobes may be equiangularly spaced about the, or each, lobed zone.

From the large number of cross-sectional shapes which have been examined for efficiency of swirl generation, a surprising rule was found. The general lobed design was unsurpassed when compared on the basis of its swirl intensity per pressure cost. This was surprising because the pressure costs were relatively high when compared to, say, a regular hexagonal section. The swirl intensity afforded by such a lobed design far exceeded most of the simple geometric shapes. A further surprise was that the 3-lobed design was less effective than the 4-lobed design, and that this was slightly better than 5- or higher numbers of lobes.

Preferably in any said lobed zone, the cross-sectional shapes of the lobes are defined by circular arcs drawn on chords defining a notional polygon. Preferably in any said lobed zone, the shapes of the lobes are defined by semicircles drawn on chords defined by a notional polygon. More preferably the notional polygon is a regular polygon.

Desirably in a said transition zone from a circular duct section to a lobed zone, the cross-sectional shapes of the lobes at given points along the length of the transition zone are defined by circular arcs drawn on chords defining a series of notional polygons which are at least similar in the geometrical sense, the radius of curvature of said circular arcs progressively decreasing from the circular duct radius at a circular end of the transition zone to half the chord length at the (fully) lobed end of the transition zone.

According to a third aspect of the present invention there is provided a method of reducing localised wear in a duct that is arranged to transport a two phase mixture comprising the steps of:

i varying the cross-sectional shape of a flowpath through the duct by introducing at least one hollow lobe extending helically around and along the duct; and ii inducing a velocity component in the mixture that is substantially perpendicular to the flowpath by the presence of said lobe.

This method reduces localised wear, particularly but not exclusively at a bend in the duct, by reducing the proportion of particulates in the mixture that strike a wall of the duct perpendicularly, or near perpendicularly, to the direction of the flowpath.

The method may include providing a bend in the duct in a zone of the duct where there is a lobe. The method may include providing a transition zone in the duct wherein variation of the cross-sectional shape of the duct commences. The method may include varying the cross-sectional shape of the duct from circular to lobed.

The method may include extending the lobe in a helical manner along the flowpath, typically by 90°. The method may include increasing the size of the lobe along the flowpath.

The method may include providing a plurality of lobes spaced about an inner surface of the duct. The method may include spacing the lobes equiangularly about the duct.

According to a fourth aspect of the present invention there is provided a method of reducing the power required to place a first phase of a two phase mixture in suspension in a second phase of that mixture during transportation of the mixture along a duct comprising the steps of:
i) varying the cross-sectional shape of a flowpath through the duct by introducing at least one hollow lobe extending helically around and along the duct; and
ii) inducing a velocity component in the mixture that is substantially perpendicular to the flowpath by the presence of said lobe such that a denser phase of the mixture is, at least partially, placed in suspension.

This method allows the critical velocity below which settling occurs to be effectively lowered. As it is the critical velocity that determines the power that must be input to a mixture in order to achieve asymmetric flow lowering the critical velocity reduces the power required to pump the mixture around a system.

Any method according to the invention may include maintaining a constant cross-sectional area of the flowpath whilst varying said cross-sectional shape.

The method may include providing a transition zone in the duct wherein variation of the cross-sectional shape of the duct commences. The method may include varying the cross-sectional shape of the duct from circular to lobed.

The method may include extending the lobe in a helical manner along the flowpath, typically by 90°. The method may include increasing the size of the lobe along the flowpath.

The method may include providing a plurality of lobes spaced about an inner surface of the duct. The method may include spacing the lobes equiangularly about an inner circumference of the duct. The method may include providing a bend in the duct in a zone of the duct where there is a lobe.

The above method is advantageous not only in placing the two phase mixture in a suspension but also in exerting a degree of control over where a region of high concentration of particulates is located within the duct in the asymmetrical flow regime. This is particularly important in the case of entry of the mixture into, for example, a cyclone where the particles should be concentrated about the wall of the duct.

According to a fifth aspect of the present invention there is provided a processing plant in which a two phase mixture is fed from a duct substantially tangentially into a processing apparatus, wherein said duct terminates at said apparatus in a zone in which the duct cross-section includes at least one lobe extending helically along the duct wherein the duct includes a said lobe which has risen from the bottom of the duct to substantially the mid-level of the duct at its termination.

Preferably the processing plant incorporates a duct according to the first or second aspect of the present invention This invention will now be described, by way of example only, with reference to the accompanying drawings, in which.

Figure 1:
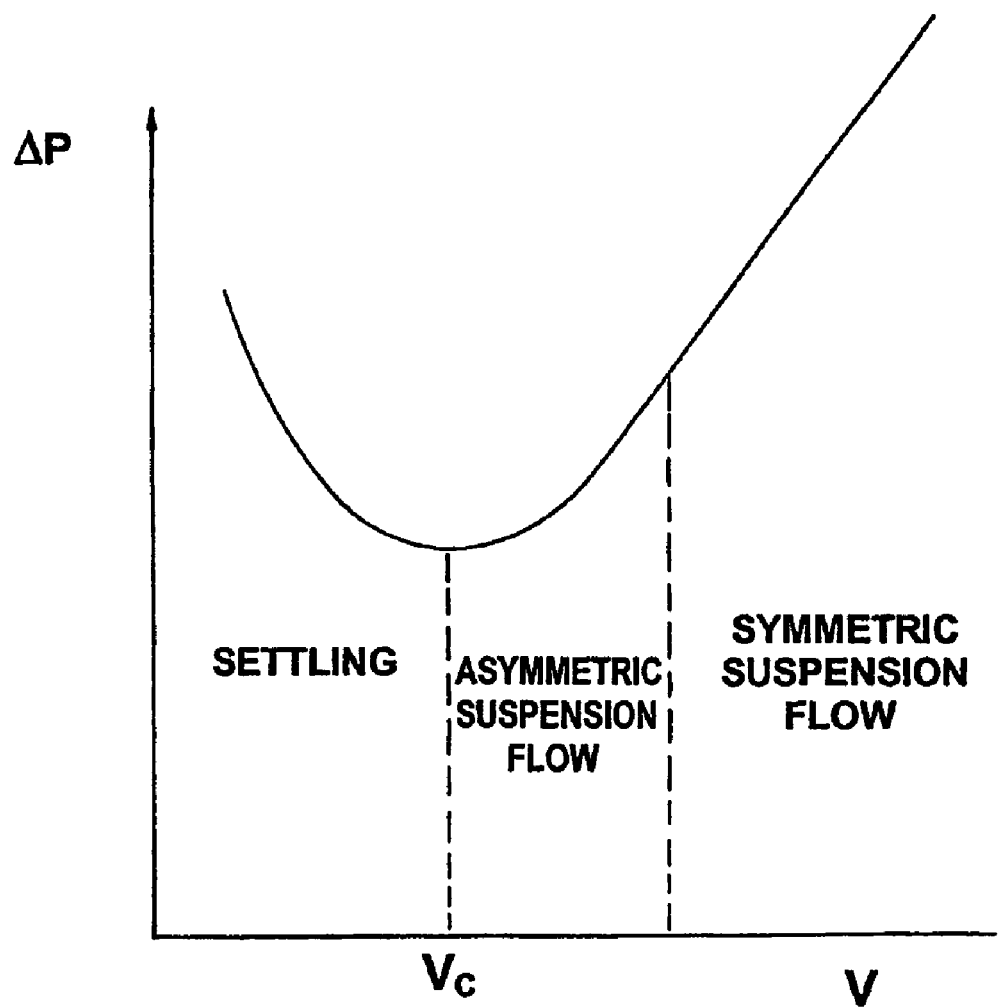
FIG. 1 is a graph of velocity against pressure for a slurry.
Figure 2:
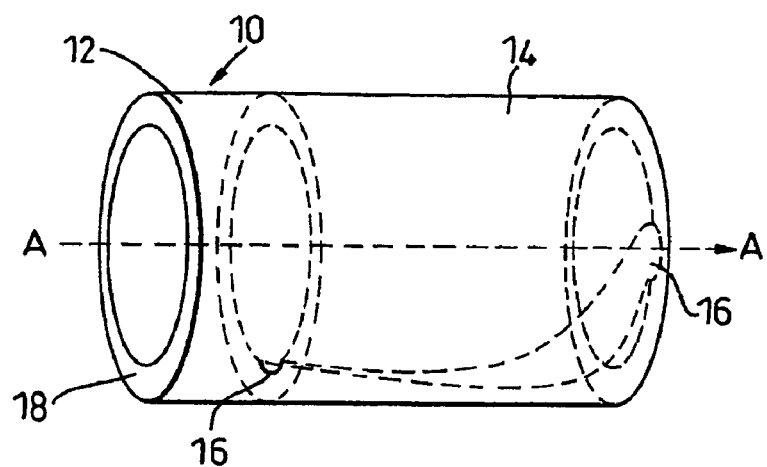
FIG. 2 is a schematic sectional view of a first embodiment of a duct according to an aspect of the present invention.

Referring now to FIG. 2, a duct 10, has a first zone 12 of circular cross-section and a second, transition zone 14. The transition zone 14 has a length which is from 5 to 11 times the diameter of the first zone 12 and has a radial lobe 16 in a wall 18 of the duct 10. In this way, the transition zone is given a duct length in which the lobe becomes relocated by at least one position, and as shown, the single lobe is relocated through an angle of 90°.

The lobe 16 is typically arcuate, usually part circular, in cross-sectional shape and the radius of the arc decreases as the transition zone 14 is traversed. The lobe 16 is illustrated as being formed within the thickness of the wall 18 of the duct. In fact, it will usually be more convenient to manufacture the duct with a substantially constant wall thickness so the presence of a concave lobe in the interior wall surface is reflected in a convex lobe on the exterior of the duct. The lobe 16 extends helically along the length of the transition zone 14 such that the lobe 16 starts to grow from the lowest point of the duct 10 and terminates approximately at its mid-point, i.e. 90° of pitch. The transition from circular to lobed cross-section is typically smooth and continuous in accordance with the second aspect of the invention.

The effect of the lobe 16 is to impart a component of velocity to a two phase mixture, or other fluid, flowing along a flow-path A-A, that is tangential to that flowpath A-A, causing the mixture to swirl within the duct 10. The helical pitch of the lobe 16 is important in that decreasing the pitch increases the tangential component of the flow rate of the mixture. It has been found that the ratio of the pitch of the helix to the, diameter of the duct 10 that is most effective in causing the mixture to swirl is between 5:1 and 11:1, with pitch ratios in the range 6.8:1 to 8.5:1 being particularly effective.

In the illustrated embodiment, the cross-sectional area of the flow path A-A through the duct 10 is maintained substantially constant by reducing the diameter of the flow orifice of the duct as the size of the lobes 16 increases. This maintains a nominally constant rate of flow of the mixture through the duct 10. However, in some particular cases the orifice diameter can be maintained constant so as to increase the overall cross-sectional area of the duct over the transition zone 14 as the size of the lobe 16 increases. This has the effect of counteracting a hydraulic gradient due to a fraction of the mixture not travelling forward and having a significant tangential component to its velocity.

Figure 3:
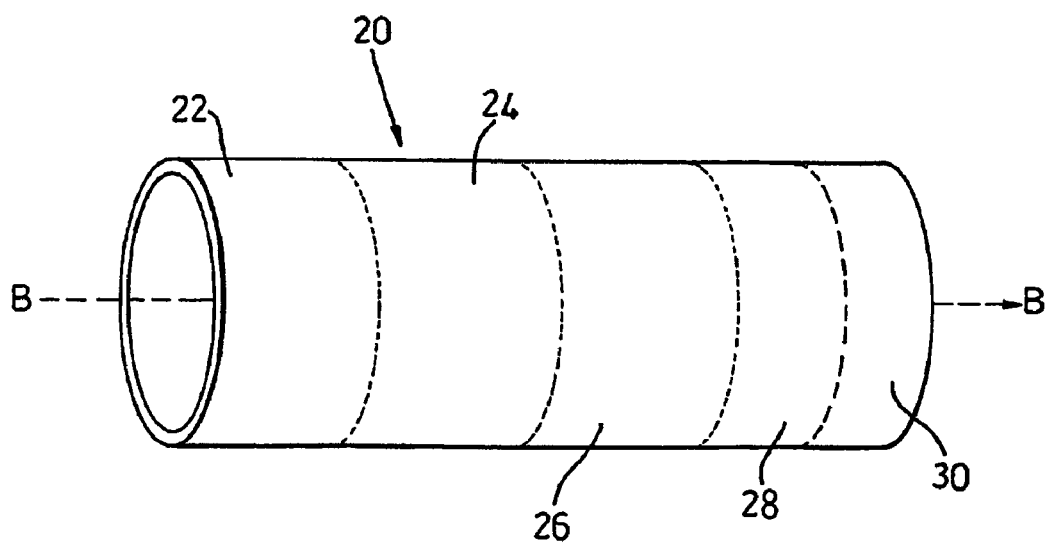
FIG. 3 is a schematic sectional view of a second embodiment of a duct according to an aspect of the present invention.

Referring now to FIG. 3, a duct 20 comprises a plain zone 22, a first transition zone 24, a constant helical zone 26, a second transition zone 28 and a second plain zone 30. The flow-path of a two phase mixture, or other fluid, through the duct 20 is indicated by the line B-B.

Mixture entering the first transition zone 24 from the plain zone 22 encounters a lobe of increasing size and optionally decreasing pitch as the flow-path is traversed. The decreasing pitch of the lobe increases the tangential component of the velocity that is imparted to the mixture. The lobe is maintained at constant size and pitch within the constant helical zone 26. The second transition zone 28 has decreasing lobe size with the pitch of the helix about the internal circumference of the duct 20 preferably being maintained constant until the lobe peters out and the second plain zone 30 is reached.

This arrangement allows the introduction of a tangential component of velocity to the mixture by the use of only a small zone of helically lobed duct. It will be appreciated that the pitch of the lobe in the first transition zone 24 can be constant should a constant known velocity be required.

Figure 4:
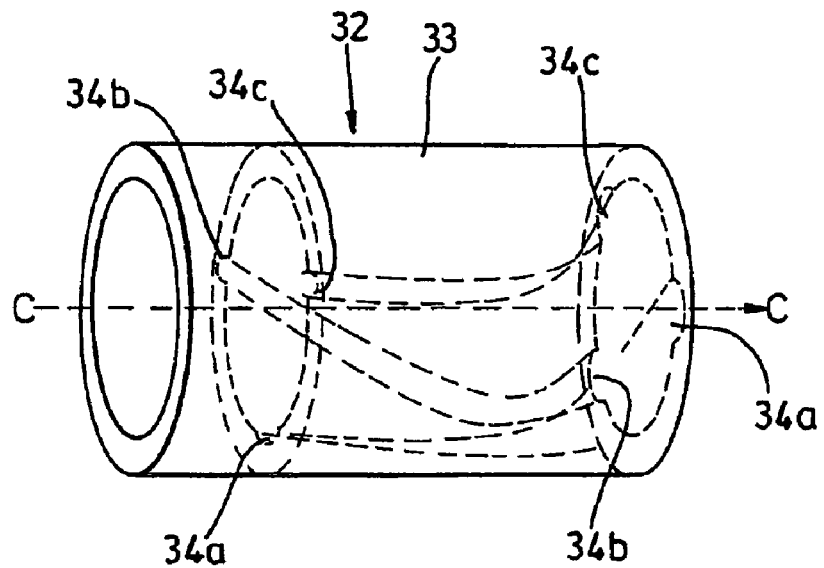
FIG. 4 is a schematic sectional view of a third embodiment of a duct according to an aspect of the present invention.

In a further embodiment of the present invention, shown in FIG. 4, there is provided a duct 32 comprising a transition zone 33 having three lobes 34*a-c* equiangularly spaced about its internal circumference. The lobes 34*a-c* increase in size as they extend helically about the circumference of the duct 32 along the transition zone 33.

It will be appreciated that any number of lobes can be employed to introduce swirl into a mixture. However, it has been found that three or four lobe yields sufficient swirl to reduce the critical velocity, above which asymmetric flow occurs, for most slurries. Any further increase in the number of lobes results in small performance improvements with increased manufacturing complexity. More than seven lobes give no significant performance advantage over a seven lobed duct.

Figure 5:
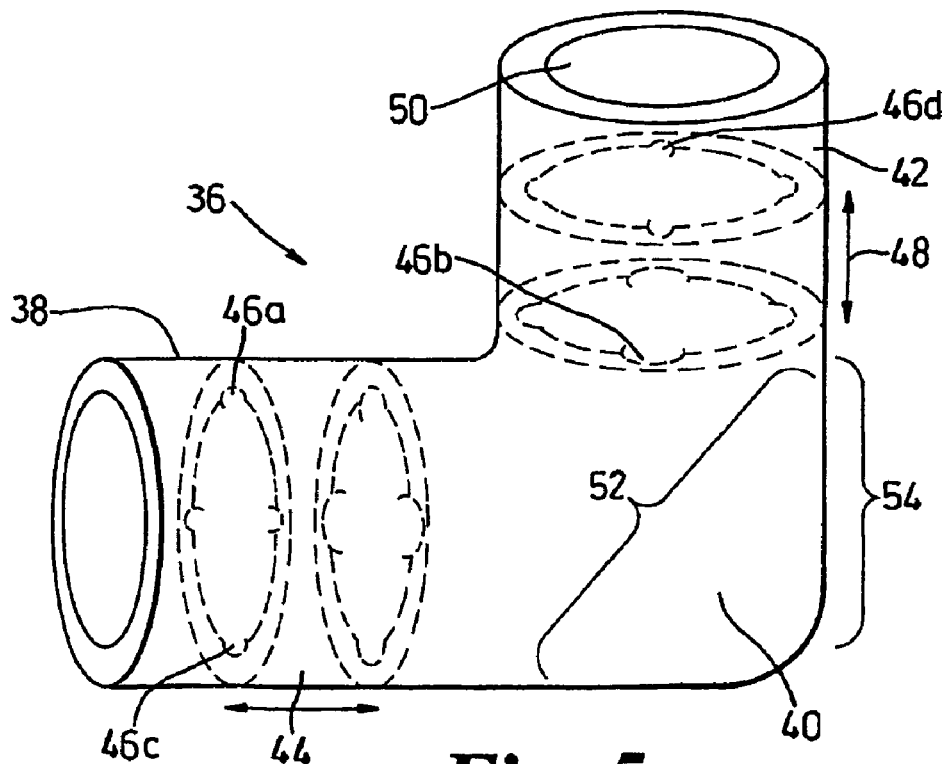
FIG. 5 is a schematic sectional view of a fourth embodiment of a duct according to an aspect of the present invention.

FIG. 5 shows a duct 36 comprising a first straight zone 38, a bend 40 and a second straight zone 42. The first straight zone 38 includes a transition zone 44, similar to that described in relation to FIG. 3, having four lobes 36*a-d*. The bend 40 maintains the lobes 46*a-d* at a constant helical pitch and at a constant size. The second straight zone 42 includes a transition zone 48 from helically rotating lobes 46*a-d* to a plain pipe 50 of circular cross-section.

A two phase mixture that is introduced into the bend has swirl induced into it. The effect of the swirl is to distribute particulates in the mixture more evenly throughout the mixture. This has the effect of reducing the critical velocity, $v_c$, at which asymmetric flow is achieved and hence reducing the pumping power that is required for the mixture to flow through the duct.

The more even distribution of particles throughout the mixture leads to different advantages in relation to wear on the duct at different mixture velocities. At lower velocities, typically 1.5 ms$^{-1}$, the use of swirl to produce a more homogeneous mixture actually reduces wear.

We mention two possible explanations for this. Computational work on low-speed (1 m/s) swirling flow into a plain bend, confirmed in experiments with beads (Relative Density=1.45) in water, predicts an overall reduction in wear. The maximum impact velocity is moved from the extrados of the bend to an angular position between 45° and 180° around the pipe periphery. For most of this arc, impact angles are extremely low. Conversely at the extrados the impact velocities are much reduced from the conventional case, but impact angles can be higher than the conventional case. The erosion rate is less sensitive to a doubling of impact angle than to a doubling of impact velocity, so the overall effect is beneficial.

Secondly, most industrial slurries have asymmetric suspensions to avoid high velocities with attendant wear and pumping power requirements. Swirling flow allows designers to use lower flow rates without blocking. This causes less wear. At high velocities the advantages of swirl are less—in fact the lobes can cause high effective friction factors.

At higher velocities, for example >3.5 ms$^{-1}$, the degree of erosion actually increases, though the erosion is more evenly distributed about the duct 36. For example, without a tangential velocity component particles entrained along the direction C-C of the first straight zone 38 strike an outer wall (extrados) 52 of the bend 40 such that a scarred zone 54 forms in the wall 52. However, with a swirl induced tangential velocity component the particulates already have a velocity component in the direction of the second straight zone 42. Therefore the particulates do not impinge directly upon the outer wall 52 but strike it obliquely thereby reducing the erosion and scarring of the wall 52. Furthermore, rebound such as might cause scarring of the intrados of the bend 40 is also reduced.

Figure 6A:
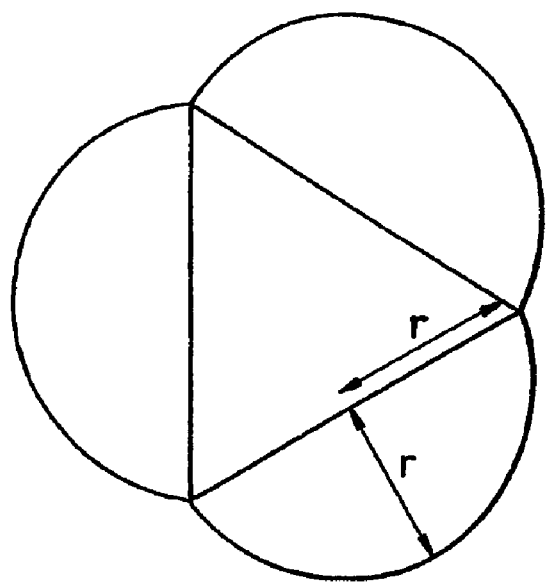
FIGS. 6a and 6b are schematic representations of polygonal arrangements used in the generation of lobes of a duct according to an aspect of the present invention.
Figure 6B:
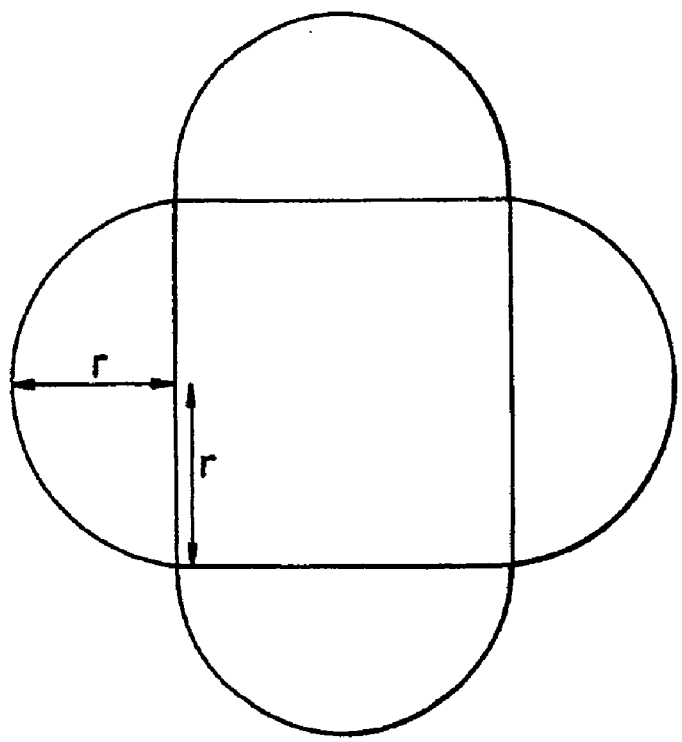

Referring now to FIGS. 6*a* and 6*b*, the increase and decrease of the size lobes where the cross-section of the duct remains constant typically involves the definition of a circular arc struck upon a chord that forms the side of a regular polygon with the radius of the circle obeying, for example, the following relationships:

For a three lobed arrangement;

$$r = \sqrt{\frac{\pi d^2}{2\sqrt{3}} \left( \frac{1}{\sqrt{3}\pi + 2} \right)} \text{ and} \quad \text{(Equation 1)}$$

for a four lobed arrangement;

$$r = \sqrt{\frac{\pi d^2}{8(\pi + 2)}}. \quad \text{(Equation 2)}$$

Where r is the radius of a fully formed lobe and also half the length of the side of a suitable regular polygon; and d is the diameter of a plain cylindrical pipe of the cross-section to be maintained.

Figure 7A:
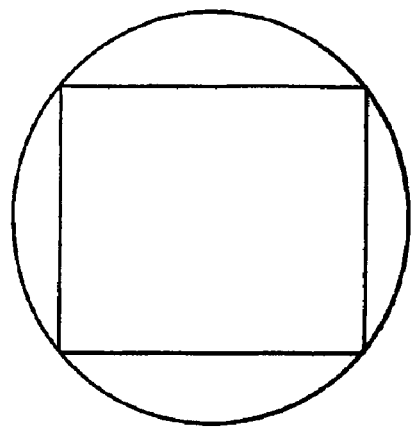
FIGS. 7a to 7c show schematically the growth of lobes on a four lobed duct according to an aspect of the present invention.
Figure 7B:
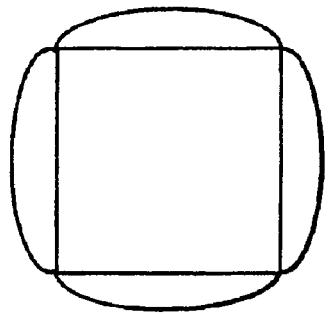
Figure 7C:
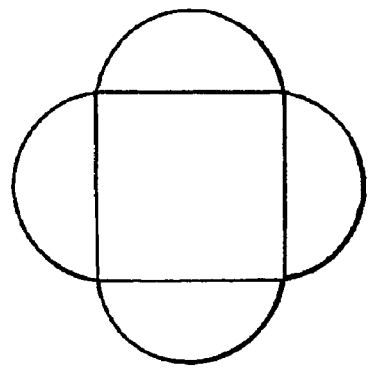
Figure 8A:
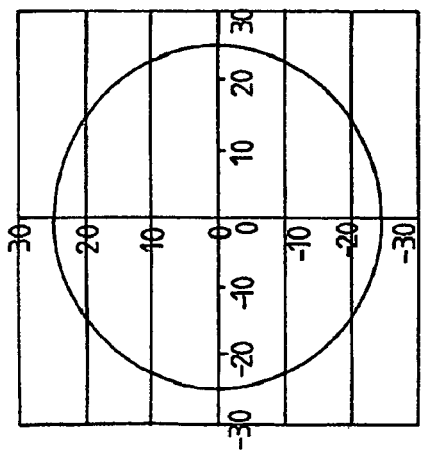
FIGS. 8a to 8k show schematically the growth of lobes on a three fold duct, incorporating helical twist, according to an aspect of the present invention.
Figure 8B:
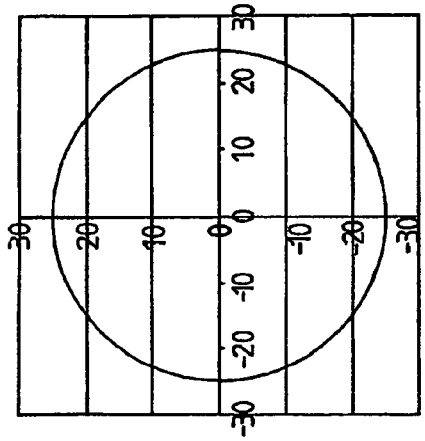
Figure 8C:
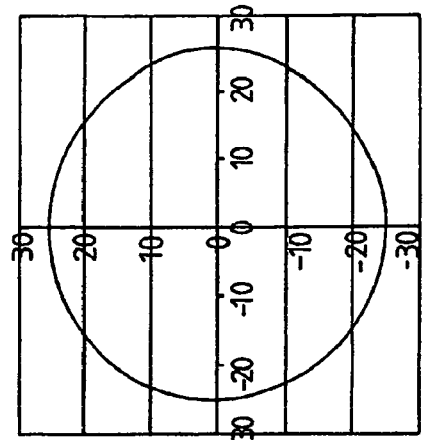
Figure 8D:
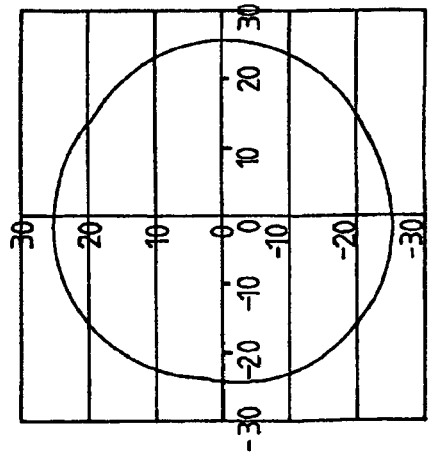
Figure 8E:
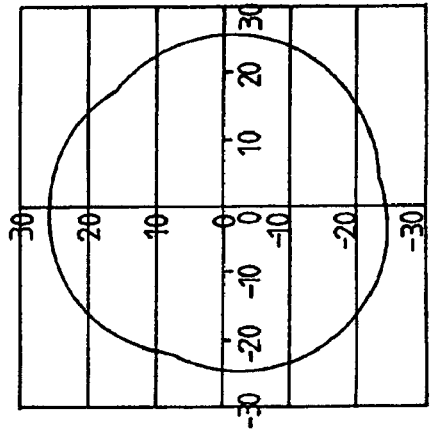
Figure 8F:
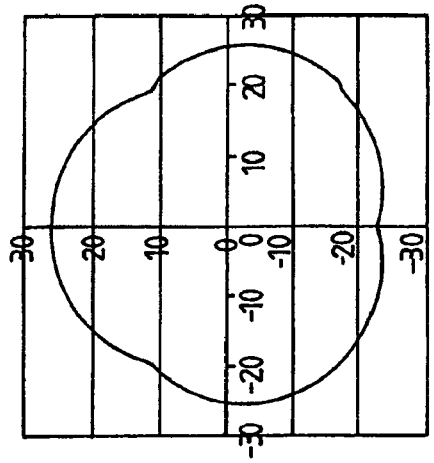
Figure 8I:
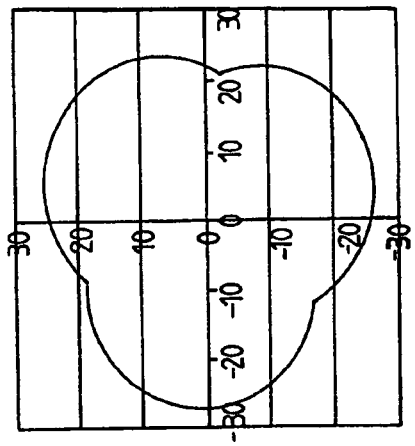
Figure 8H:
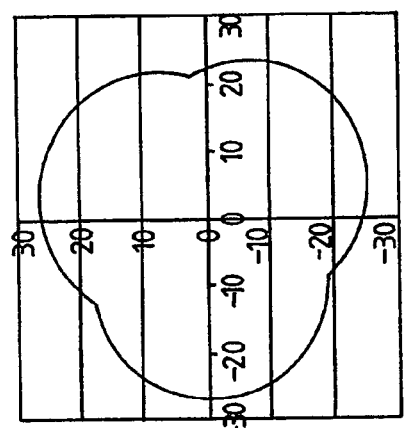
Figure 8K:
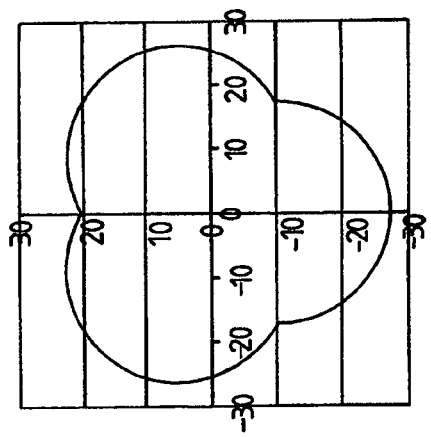
Figure 8G:
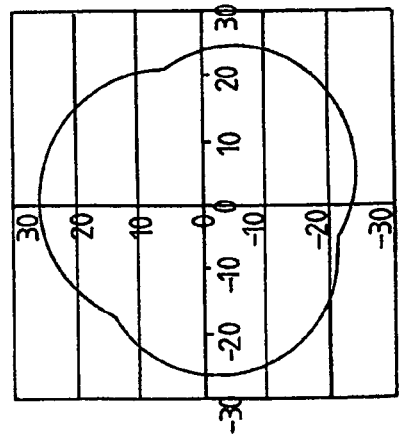
Figure 8J:
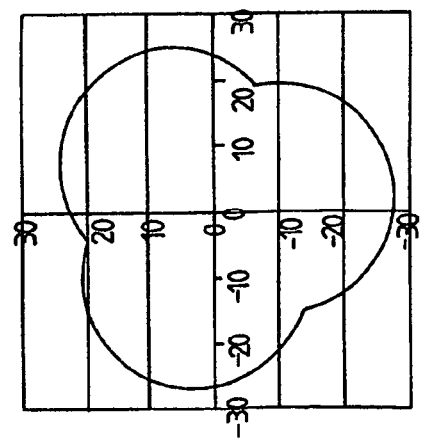

Referring now to FIGS. 7*a* to 7*c*, in the case of a four lobed duct a circle of diameter d can be considered as the cross-section of a plain duct. The circle circumscribes a square that forms the basis of the growth of lobes. Whilst keeping the cross-sectional area constant the length of the sides of the square decreases, the radius of curvature of the arc decreases so that the height of the lobe increases, until the limiting case detailed above in Equation 2 is reached.

Referring now to FIGS. 8*a* to 8*k*, these show a similar growth of lobes for a three lobed duct as that shown in FIGS. 7*a* to 7*c*, for a four lobed arrangement, including the effect of helical twist of the lobes. The cross-sectional area of the duct is maintained constant whilst the radius of curvature of the arc decreases and the height of the lobe increases until the limiting case detailed above in Equation 1 is reached.

It will be seen that if the normal cross-sections and through the duct taken at upstream 8*a*, 8*b* and downstream 8*k* locations at or towards each end of the transition zone duct length are notionally superposed one on the other (without any relative rotation), the amount by which the position of any given lobe has been rotated in going from the upstream to the downstream cross-section is that which gives a (first) non-overlapping relationship between the two positions of such lobe. Thus, in the illustrated case where there are provided three contiguous lobes whose cross-sections are eventually formed as three semi-circles meeting at cusps at the apices of a notional equilateral triangle, the angle through which a given lobe has been relocated is 120°. In that case, at the downstream cross-section, each lobe will overlap with the position which a neighbouring lobe occupied at the upstream cross-section. In general, for n contiguous lobes, the minimum angle will be $360°/n$.

Figure 9:
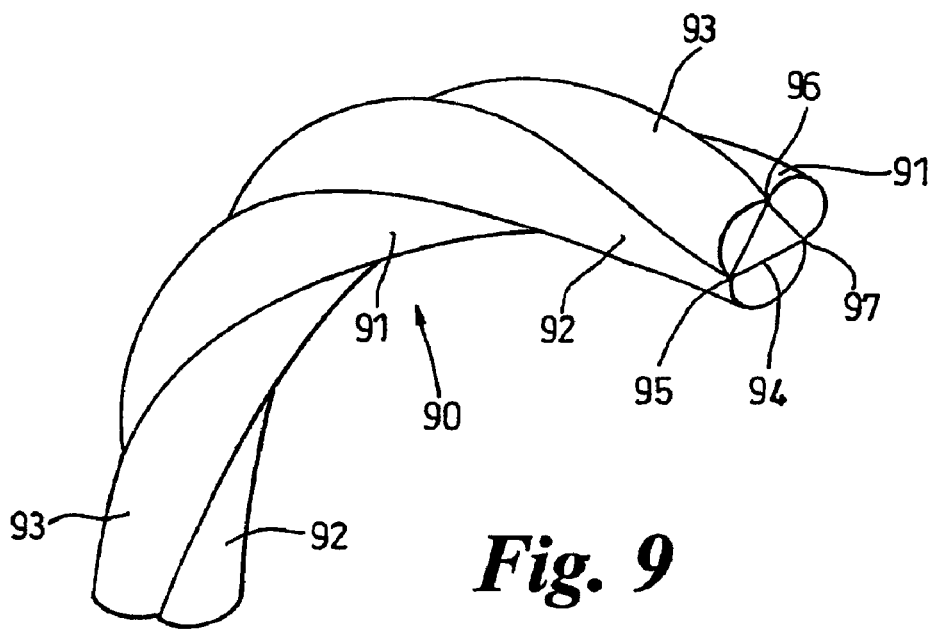
FIGS. 9 and 10 each illustrate a lobed duct section leading around a bend.

FIG. 9 illustrates a preferred form of the inner wall of a three-lobed duct section as it rounds a bend 90. The three lobes 91, 92, 93, are formed as semicircles based on the three sides of a notional equilateral triangle 94, the three lobes being contiguous and meeting at cusps at the apices 95, 96, 97 of the triangle 94. The duct is of uniform cross-section as it rounds the bend, though of course that cross-section progressively rotates along the duct.

In the embodiment shown, the radius of curvature of the bend 90 (taken at the centre of the duct) is six times the equivalent diameter d of a circle corresponding to the duct section. Compare Equation 1. The benefits of the invention are most manifest when the radius of curvature of the centre line of the bend is at least 1.5 times such equivalent diameter.

Figure 10:
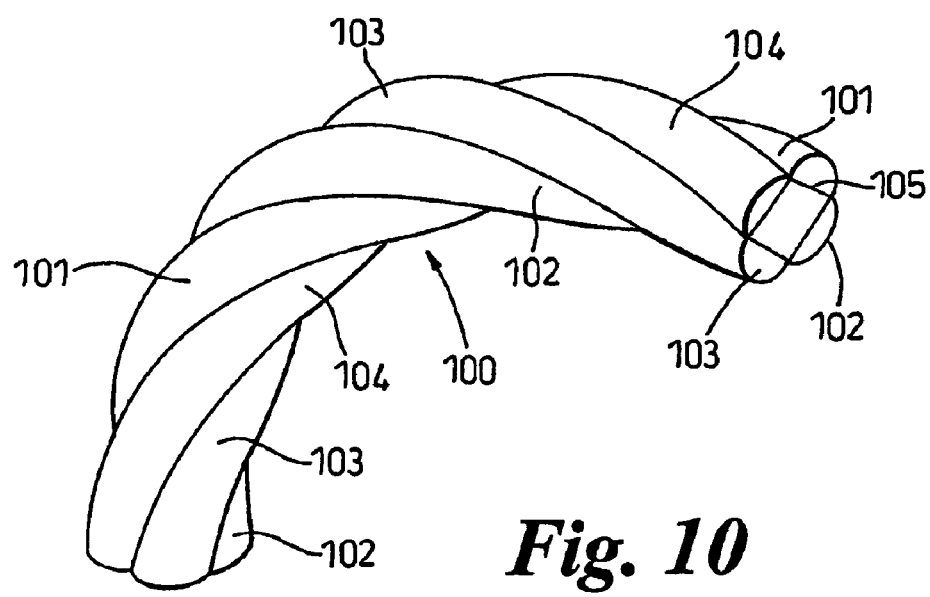

FIG. 10 illustrates a right-angled bend 100 formed by a four-lobed duct section. Four lobes 101, 102, 103, 104 are formed as semi-circles based on the four sides of a notional square 105, the four lobes being contiguous and meeting at cusps at the corners of the square 94. The duct is of uniform cross-section as it rounds the bend, though of course that cross-section progressively rotates along the duct.

The invention claimed is:

1. A duct comprising at least one length portion of circular cross-section, wherein said duct further comprises a lobed zone in which its cross-section exhibits at least one lobe, wherein each lobe extends helically around and along the duct, and wherein a transition from a circular duct section having a circular cross-section to the lobed zone having a lobed cross-section is smooth and continuous and takes place over a transition zone occupying a duct length in which each lobe becomes relocated by at least one position, and wherein within a said transition zone, cross-sectional shapes of the lobes at given points along the length of the transition zone are defined by circular arcs drawn on chords defining a series of notional polygons which are at least geometrically similar, and wherein the radius of curvature of said circular arcs progressively decrease from the circular duct radius at a circular end of the transition zone to half a chord length at a lobed end of the transition zone.

2. The duct according to claim 1, wherein each lobe is relocated by a maximum of one revolution about the duct.

3. The duct according to claim 1, wherein the transition zone occupies a duct length of at least 5D/n where D is a diameter of an immediately preceding circular duct length portion, and n is number of lobes.

4. The duct according to claim 1, wherein there are at least three lobes and said transition zone occupies a duct length which is less than or equal to 11D/n where D is a diameter of an immediately preceding circular duct length portion, and n is number of lobes.

5. The duct according to claim 4, wherein said transition zone occupies a duct length which is less than or equal to 8.5D/n where D is the diameter of the immediately preceding circular duct length portion, and n is the number of lobes.

6. The duct according to claim 1, wherein the lobed zone has a substantially constant cross-sectional area which is substantially equal to a preceding circular duct length portion.

7. The duct according to claim 1, wherein the duct includes a bend in a helically lobed zone thereof.

8. The duct according to claim 7, wherein the duct includes a plurality of bends each of which is located in a helically lobed zone thereof.

9. The duct according to claim 1, wherein at least one helically lobed zone of the duct is located spaced from an end of the duct and is followed by a second transition zone in which the lobed cross-section reverts to a circular cross-section.

10. The duct according to claim 9, wherein the cross-sectional area of the duct remains substantially constant over said second transition zone.

11. The duct according to claim 9, wherein said second transition zone occupies a duct length which is between 5/n and 11/n times a duct diameter where n is number of lobes.

12. The duct according to claim 1, wherein a pitch of the helical lobes in the transition zone decreases towards the lobed cross-section.

13. The duct according to claim 1, wherein a pitch of the helical lobes in the lobed zone decreases in a direction downstream of the transition zone.

14. The duct according to claim 1, wherein a pitch of the helical lobes in the lobed zone remains substantially constant.

15. The duct according to claim 1, wherein a pitch of the helical lobes in a second transition zone remains substantially constant.

16. The duct according to claim 14, wherein the pitch is between 5 and 11 times a diameter of the circular duct section.

17. The duct according to claim 16, wherein the pitch is between 6.8 and 8.5 times the diameter of the circular duct section.

18. The duct according to claim 1, wherein there are at least three lobes in each lobed zone.

19. The duct according to claim 1, wherein there are at most seven lobes in each lobed zone.

20. The duct according to claim 18 wherein there are four lobes in at least one lobed zone.

21. The duct according to claim 20, wherein there are four lobes in each lobed zone.

22. The duct according to claim 18, wherein the lobes are equiangularly spaced about each lobed zone.

23. The duct according to claim 1, wherein a lobe is arranged to pass through a concentrated region of a denser phase of a mixture when the mixture is in an asymmetric flow regime and each lobe is arranged to transport a portion of the denser phase to a less concentrated region.

24. A duct comprising at least one length portion of circular cross-section, wherein said duct further comprises a lobed zone in which its cross-section exhibits at least one lobe, wherein each lobe extends helically around and along the duct, and wherein a transition from a circular duct section having a circular cross-section to the lobed zone having a lobed cross-section is smooth and continuous and takes place over a transition zone occupying a duct length in which each lobe becomes relocated by at least one position, and wherein within any said lobed zone, cross-sectional shapes of the lobes are defined by circular arcs drawn on chords defining a notional polygon.

25. A duct comprising at least one length portion of circular cross-section, wherein said duct further comprises a lobed zone in which its cross-section exhibits at least one lobe, wherein each lobe extends helically around and along the duct, and wherein a transition from a circular duct section having a circular cross-section to the lobed zone having a lobed cross-section is smooth and continuous and takes place over a transition zone occupying a duct length in which each lobe becomes relocated by at least one position, and wherein within any said lobed zone, shapes of the lobes are defined by semicircles drawn on chords defined by a notional polygon.

26. The duct according to claim 24, wherein the notional polygon is a regular polygon.

27. A duct having at least one length portion of circular cross-section, wherein the duct further includes a lobed zone in which its cross-section exhibits at least one lobe, wherein each lobe extends helically around and along the duct, and wherein the duct has a substantially constant cross-sectional area over a first transition zone in which the duct cross-section changes from circular to lobed, and wherein at least one helically lobed zone of the duct which is located spaced from an end of the duct and is followed by a second transition zone in which the lobed cross-section reverts to a circular cross-section.

28. The duct according to claim 27, wherein the transition from circular to lobed cross-section is smooth and continuous and takes place over said transition zone occupying a duct length in which each lobe becomes relocated by at least one position.

29. The duct according to claim 28, wherein the transition zone occupies a duct length of at least 5D/n where D is a diameter of an immediately preceding length portion of circular cross-section, and n is number of lobes.

30. The duct according to claim 28, wherein there are at least three lobes and said transition zone occupies a duct length which is less than or equal to 11D/n where D is a diameter of an immediately preceding length portion of circular cross-section, and n is number of lobes.

31. The duct according to claim 30, wherein said transition zone occupies a duct length which is less than or equal to 8.5D/n where D is the diameter of the immediately preceding length portion of circular cross-section, and n is the number of lobes.

32. The duct according to claim 27, wherein such lobed zone has a substantially constant cross-sectional area which is substantially equal to a preceding length portion of circular cross-section.

33. The duct according to claim 27, wherein the duct includes a bend in a helically lobed zone thereof.

34. The duct according to claim 33, wherein the duct includes a plurality of bends each of which is located in a helically lobed zone thereof.

35. The duct according to claim 27, wherein the cross-sectional area of the duct remains substantially constant over said second transition zone.

36. The duct according to claim 27, wherein said second transition zone occupies a duct length which is between 5/n and 11/n times a duct diameter where n is number of lobes.

37. The duct according to claim 27, wherein a pitch of the helical lobes in the first transition zone decreases towards the lobed cross-section.

38. The duct according to claim 27, wherein a pitch of the helical lobes in the lobed zone decreases in a direction downstream of the first transition zone.

39. The duct according to claim 27, wherein a pitch of the helical lobes in the lobed zone remains substantially constant.

40. The duct according to claim 27, wherein a pitch of the helical lobes in the second transition zone remains substantially constant.

41. The duct according to claim 39, wherein said pitch is between 5 and 11 times a diameter of the circular cross section.

42. The duct according to claim 41, wherein said pitch is between 6.8 and 8.5 times the diameter of the circular cross section.

43. The duct according to claim 27, wherein there are at least three lobes in each lobed zone.

44. The duct according to claim 27, wherein there are at most seven lobes in each lobed zone.

45. The duct according to claim 43, wherein there are four lobes in at least one lobed zone.

46. The duct according to claim 45, wherein there are four lobes in each lobed zone.

47. The duct according to claim 43, wherein the lobes are equiangularly spaced about each lobed zone.

48. The duct according to claim 27, wherein the lobe is arranged to pass through a concentrated region of a denser phase of a mixture when a mixture is in an asymmetric flow regime and each lobe is arranged to transport a portion of a denser phase to a less concentrated region.

49. A duct having at least one length portion of circular cross-section, wherein the duct further includes a lobed zone in which its cross-section exhibits at least one lobe, wherein each lobe extends helically around and along the duct, and wherein the duct has a substantially constant cross-sectional area over a first transition zone in which the duct cross-section changes from circular to lobed, and wherein in any said lobed zone, cross-sectional shapes of the lobes are defined by circular arcs drawn on chords defining a notional polygon.

50. The duct according to claim 49, wherein the notional polygon is a regular polygon.

51. A duct comprising at least one length portion of circular cross-section, wherein said duct further comprises a lobed zone in which its cross-section exhibits at least one lobe, wherein each lobe extends helically around and along the duct, and wherein a transition from a circular duct section having a circular cross-section to the lobed zone having a lobed cross-section is smooth and continuous and takes place over a transition zone occupying a duct length in which each lobe becomes relocated by at least one position, and wherein the cross-sectional area of the duct in at least part of the transition zone increases progressively.

52. A duct having at least one length portion of circular cross-section, wherein the duct further includes a lobed zone in which its cross-section exhibits at least one lobe, wherein each lobe extends helically around and along the duct, and wherein the duct has a substantially constant cross-sectional area over a first transition zone in which the duct cross-section changes from circular to lobed, and wherein in any said lobed zone, shapes of the lobes are defined by semicircles drawn on chords defined by a notional polygon.

* * * * *